(No Model.)  5 Sheets—Sheet 1.

F. H. RICHARDS.
WEIGHING MACHINE.

No. 579,448.  Patented Mar. 23, 1897.

Witnesses:
R. W. Pittman
Fred. J. Dole.

Inventor:
F. H. Richards.

(No Model.)
F. H. RICHARDS
WEIGHING MACHINE.

No. 579,448.  
5 Sheets—Sheet 2.  
Patented Mar. 23, 1897.

Witnesses:  
R. W. Pittman  
Fred. J. Dole.

Inventor:  
F. H. Richards.

(No Model.)  5 Sheets—Sheet 3.

F. H. RICHARDS.
WEIGHING MACHINE.

No. 579,448. Patented Mar. 23, 1897.

Witnesses:
R. W. Pittman
Fred. J. Dole.

Inventor:
F. H. Richards (No Model.) 5 Sheets—Sheet 4.

F. H. RICHARDS.
WEIGHING MACHINE.

No. 579,448. Patented Mar. 23, 1897.

Witnesses:
R. W. Pittman
Fred. J. Dole.

Inventor:
F. H. Richards.

(No Model.)  F. H. RICHARDS.  5 Sheets—Sheet 5.
WEIGHING MACHINE.
No. 579,448.  Patented Mar. 23, 1897.
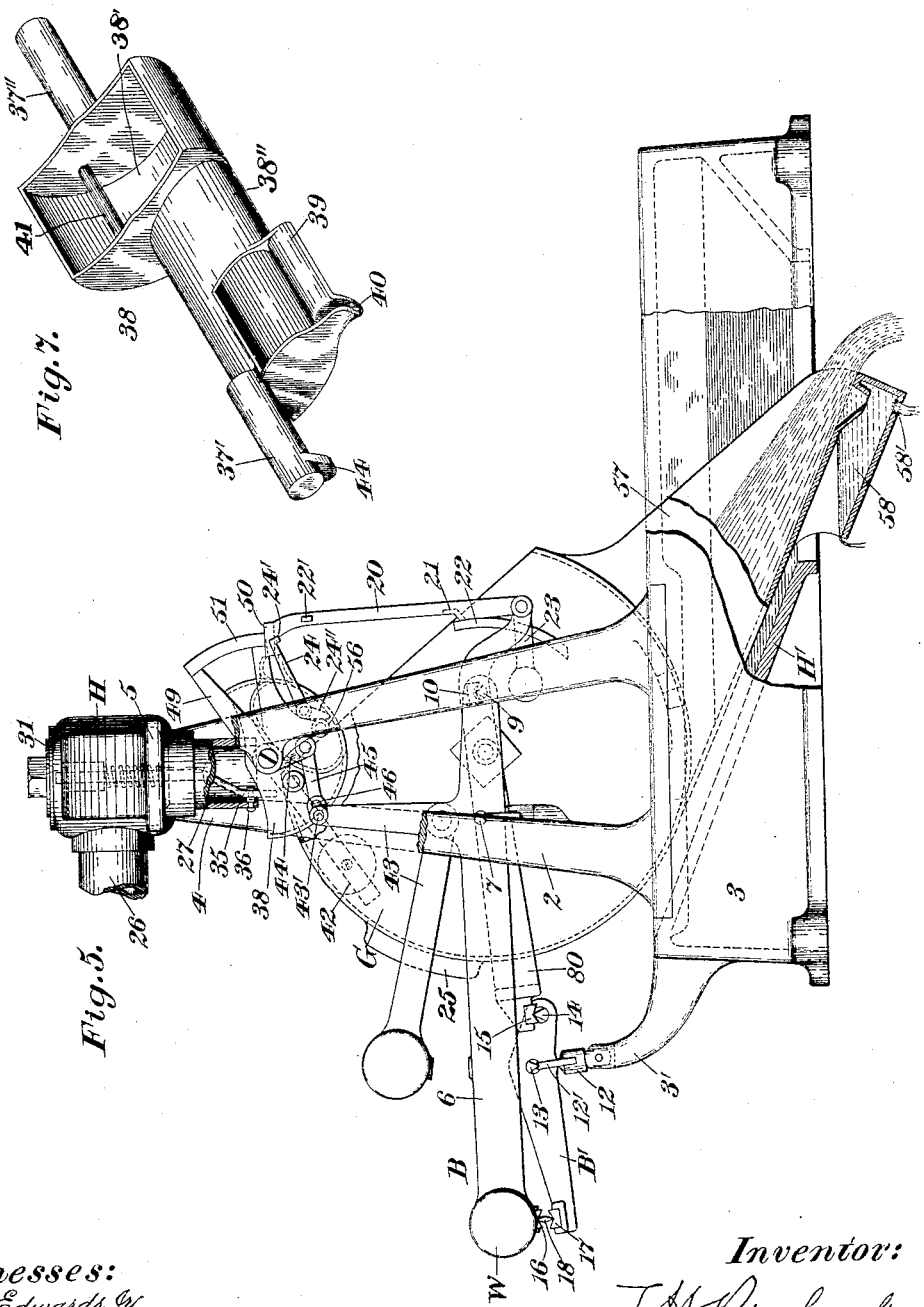
Witnesses:
J. L. Edwards Jr.
Fred. J. Dole.
Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 579,448, dated March 23, 1897.

Application filed July 1, 1896. Serial No. 597,680. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved machine of this character more especially adapted for automatically weighing and delivering predetermined quantities of liquids with precision and facility.

Figure 1:
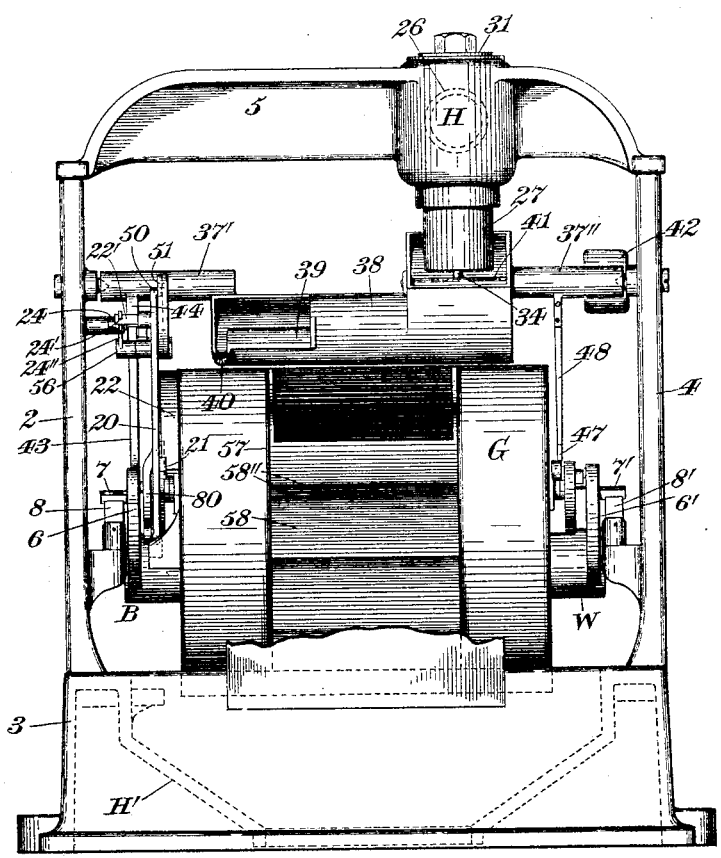
Figure 2:
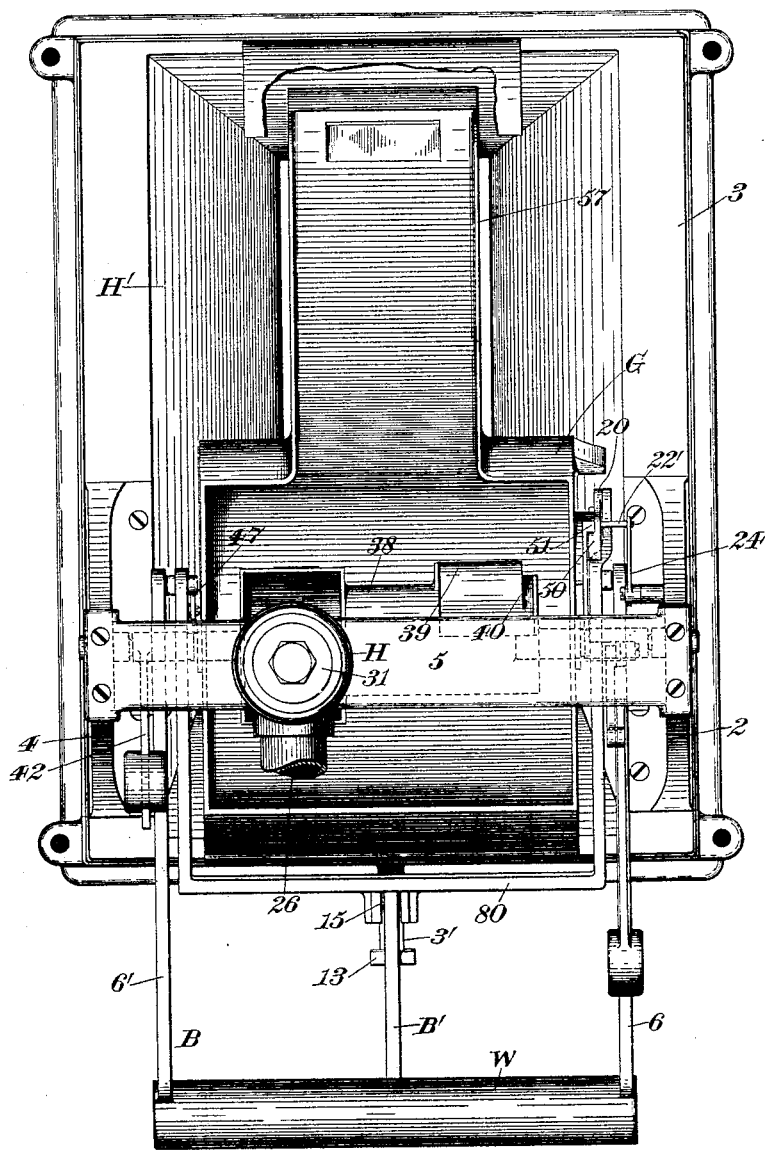
Figure 3:
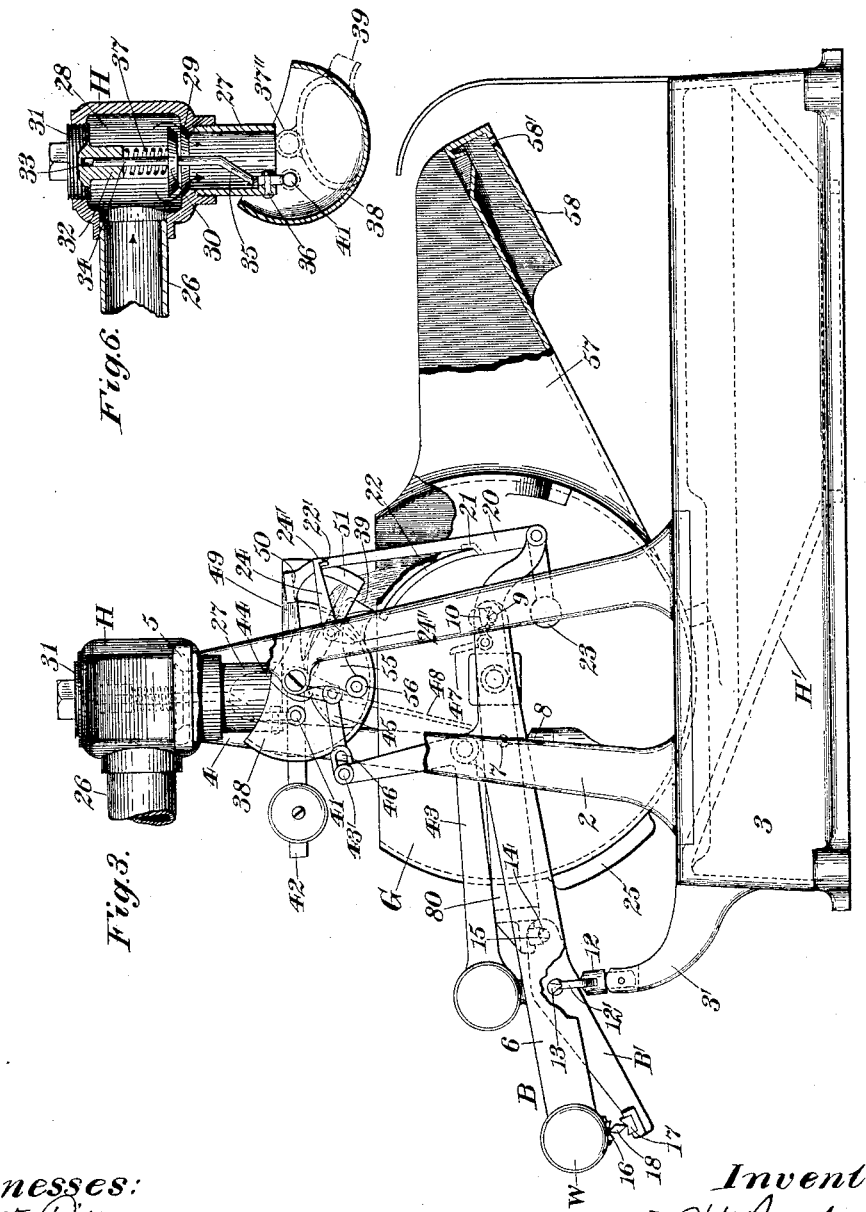
Figure 4:
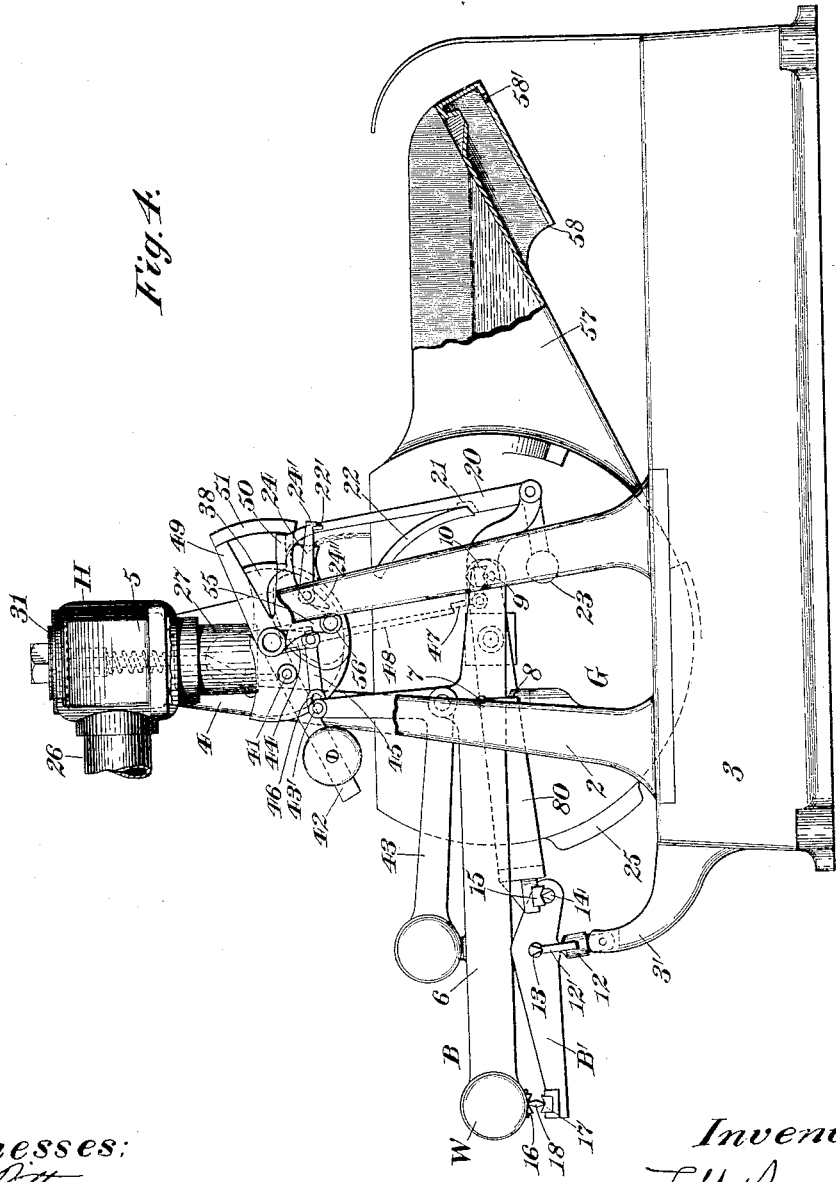

In the drawings accompanying and forming part of this specification, Figure 1 is a front elevation of a weighing-machine comprehending my present improvements in the preferred embodiment thereof. Fig. 2 is a plan view of the machine. Fig. 3 is an end elevation as seen from the left in Fig. 1, illustrating the positions occupied by the various parts at the commencement of operation. Figs. 4 and 5 are similar views to Fig. 3 of the machine during the poising and load-discharge periods, respectively. Figs. 6 and 7 are detail views hereinafter more particularly described.

Similar characters designate like parts in all the figures of the drawings.

The framework for supporting the various parts of the machine may be of any suitable or preferred construction, and it is herein shown comprising the uprights or columns 2 and 4, mounted upon the base 3, between the walls of which latter the hopper H' may be supported and into which the loads of liquid from the bucket of the weighing-machine will be intermittingly discharged. The uprights 2 and 4 are shown connected at the top by the beam or plate 5, with which may be integrally formed the fluid-casing H, hereinafter more particularly described.

The bucket or load-carrying receptacle of the machine is designated by G and is of the "oscillatory" or "tilting" type, it being normally held against discharge movement by suitable detent mechanism, one form of which will be hereinafter described.

For supporting the bucket mechanism, which includes the bucket and its operative devices, the improved beam mechanism illustrated in the accompanying drawings will be preferably employed, said mechanism comprising a main and an auxiliary scale-beam, each provided with suitable bucket-supports. The main scale-beam is designated by B and is shown consisting of a pair of arms 6 and 6', joined at the rear by the combined counterweight and connecting-shaft W. The main scale-beam B will be preferably fulcrumed or supported on the framing of the machine, its arms 6 and 6' being furnished with the pivots or knife-edges 7 and 7', adapted to rest on V-shaped or other bearings, as 8 and 8', connected to the uprights 2 and 4, respectively.

A bucket-frame or yoke is shown at 80, the bucket G being pivoted between the forward-projecting arms of said frame 80, said bucket being furnished with laterally-projecting trunnions working in suitable journal-openings formed in said arms. The scale-beam B or the arms 6 and 6' thereof will carry bucket-supports adjacent to the inner ends thereof, said bucket-supports consisting in the present instance of pivots or knife-edges 9, sustaining V-shaped or similar bearings 10 on the bucket-frame arms. The auxiliary scale-beam is designated by B', it being shown supported for longitudinal movement between the arms 6 and 6' of the main scale-beam B. The auxiliary scale-beam B' will also preferably have a movement in unison with the main scale-beam B.

A yieldingly-supported block is shown at 12, furnished with a beam support or bearing 12', said block being pivoted to the rearwardly-extending arm 3' of the base 3. The auxiliary beam B' is also furnished with a pivot or knife-edge 13, mounted on the V-shaped bearing 12'. The auxiliary beam B', at a point adjacent to its inner end, is equipped with a pivot or knife-edge 14, which works against or is in contact with a V or other bearing, as 15, depending from the bucket-frame 80 at a point about midway thereof. The counterweight W of the scale-beam B, intermediate its ends, is provided, preferably, with a bearing 16, the auxiliary beam B' having the complemental bearing 17, the compound knife-edge 18 working against such bearings.

The center of gravity of the loaded bucket will be located at a point between the axis of movement of said bucket and the supports 9 thereof, so that when said bucket is released at the proper period in the operation of the machine the weight of the material or liquid therein will automatically oscillate or tilt said bucket for discharging its contents into the hopper H'.

For normally holding the bucket G against discharge movement the following mechanism may be employed: One of the arms of the bucket-frame 80 is shown extended beyond the other arm and pivotally carrying at its outer end the counterweighted angle-lever 20, which serves a dual function, as will hereinafter appear. The long arm of the angle-lever 20 is provided with the offset detent 21, adapted to engage the coacting detent 22 on the bucket when the latter is in its normal or load-receiving position, said detent 22 being shown as a segmental flange projecting from the bucket.

It will be evident that by virtue of the counterweight 23 the two stops 21 and 22 will be held in engagement, as indicated in Fig. 3. For preventing the disengagement of these parts a bucket-latch is illustrated at 24, it being pivotally supported by the upright 2 and having a hook 24', adapted to engage the projection or pin 22', extending laterally from the angle-lever 20.

It will be evident that by tripping or raising the latch 24 at the proper period in the operation of the machine the angle-lever 20, and hence the bucket G, is freed of all restraint, so that the latter may be instantly operated for discharging its contents into the hopper H'. For returning the bucket G to its normal position a counterweight 25 of proper efficiency may be attached to the rear wall thereof.

For supplying the bucket G with a stream of material the supply-casing H will communicate with a suitable reservoir (not shown) by means of the inflow conduit or pipe 26, suitably secured within an opening or aperture formed in the rear wall of said casing, the bottom wall of the latter having formed therein a like opening or aperture, in which is secured the outflow-pipe 27, adapted for directing a stream of material or liquid into the bucket G. The chamber 28 of the casing H constitutes a valve-chamber, a suitable liquid-controlling valve being operative therein, the valve in the present instance being of the "puppet" type.

An annular valve-seat is illustrated at 29 adjacent to the outflow or delivery pipe 27, against which the puppet-valve 30 (herein shown as a flat disk) is adapted to bear when in its cut-off position. The upper wall of the casing H is intersected by an opening which is adapted for the reception of a screw-threaded plug 31, it being evident that the latter is removable, so that access may be had to the chamber of the casing H for various purposes. The removable plug 31 has formed thereon the downward extension 32, having the central socket 33, in which the stem 34 of the valve is reciprocative, the wall of said socket constituting a suitable guide for said stem, and hence for the valve 30. The valve 30 is furnished with the depending bent rod or bar 35, which serves as a convenient means for transmitting an opening thrust to said valve, by which the supply-stream is permitted to flow into the bucket, said rod 35 terminating in a furcation which straddles the pin 36, projecting through the wall of the pipe 27, said pin being preferably headed at its inner end, so that the lateral displacement of the bar 35, and hence of the valve 30, is prevented.

For closing the valve a spring-actuator 37 is illustrated, consisting in the present instance of a coiled spring bearing against the plug projection 32 and the upper face of the valve 30, the normal tendency of said spring being to shut the valve 30, this action, however, being checked during the normal operation of the machine. By screwing the plug 31 either in or out the tension of the spring 37 may be correspondingly varied, whereby the action of the valve 30 may be regulated with precision.

The valve 30 constitutes a reducing-valve for reducing the volume of the supply-stream received from the inflow-pipe. For cutting off the supply to the bucket the valve 38 is illustrated, said valve being supported for oscillatory movement beneath the outlet of the pipe 27, and being also of "pan" shape. The valve 38 is pivotally supported between the uprights 2 and 4, being furnished with the laterally-extending arms 37' and 37'', having bearings in the outer ends thereof for the reception of suitable journals carried by said uprights.

The valve 38, except at the inlet and the outlet openings thereof, will be closed, it being in the nature of a conduit, the upwardly-extending end walls, located immediately below the outflow-pipe 27, serving as a means for preventing spattering and the accidental escape and consequent waste of material during the flow of the supply-stream, the adjacent tubular portion 38' of the valve, which may be elliptical in cross-section, also serving as an additional means for this purpose. The liquid will flow from the pipe 27 into the main supply-chamber 38' of valve 38 and laterally of said valve through the tubular portion thereof, it being discharged over the main-stream valve-spout 39, which consists of a curved or bent lip extending outward from the valve. There is illustrated adjacent to said spout 39 a second spout 40, comprising a drip-spout, it being in the form of a channel or depression formed near the end wall of the valve opposite to that at which the stream flows thereinto. When the flow of the main stream has been stopped or cut off, a relatively fine stream may flow from the body of liquid in the valve 38, said valve serving as a reservoir for this purpose, through the drip-spout 40 and into the bucket G, the purpose of said drip-stream being to complete the partial load in the bucket.

It will be remembered that the normal tendency of the reducing or puppet valve 30 is to close, due to the action of the coiled spring 37, this action, however, being checked or limited during the major period of the operation of the machine. For thus limiting or checking the closing movement of the reducing-valve 30 the valve 38 will be preferably utilized. A cross-bar is shown at 41 extending between and suitably secured to the end walls of the relatively deep portion of the valve 38, against which the lower end of the rod 35 is adapted to abut, whereby on the closure of the valve 38 the corresponding movement of the valve 30 will be checked, as is readily obvious. On the opening movement of the valve 38 the cross-bar 41 will impinge against the rod 35, and an upward thrust will be imparted to said rod and in turn communicated to the valve 30 for forcing it away from its seat, to thereby permit the flow of the supply-stream into the bucket G.

The valve 38 is illustrated in its open position in Fig. 3, it being also operable for holding the puppet-valve 30 open through the medium of the cross-bar 41, which abuts against the rod 35. For closing the valve 38, whereby the cross-bar 41 thereof is caused to move away from the rod 35, a counterweighted arm is illustrated at 42, extending rearward from and preferably formed integral with the valve-supporting arm 37''. The normal tendency of the counterweighted arm 42 is to close the valve 38, to thereby permit the closing or shutting of the puppet-valve 30 by the spring 37 in the manner previously described. This movement of the valve 38 by the counterweighted lever 42 will also be limited, the valve-opening actuator constituting a suitable means for this purpose.

For opening the valve 38, and hence the puppet-valve 30, by the power of said first-mentioned valve a shiftable counterweighted lever is illustrated at 43, said lever being of the "angle" type and pivotally supported by the beam B at a point perpendicular to the fulcrum of said beam. The non-counterweighted arm of the lever 43 is shown operatively connected with the valve 38, the latter having a lug or ear 44, to which is pivoted the link 45, the opposite end of said link having formed therein a longitudinal slot 46. The upright arm of the angle-lever 43 is provided with a laterally-projecting pin 43', passing through the longitudinal slot 46 of the link 45, by which sliding connection the counterweighted lever 43 may have a limited amount of movement without affecting the valve 38. On the descent of the poising side of the scale-beam B, or that part to the right of its fulcrum, the upright arm of the angle-lever 43 will swing to the right in unison therewith, and the pin 43' being in contact with the left-hand short wall of the slot 46 the closing movement of the valve 38 by the lever 42 will be limited by said angle-lever 43.

When the valve 38 has been closed and immediately on the oscillation of the bucket, a stop device, to be hereinafter described, is called into play for locking said valve against opening movement while the bucket is discharging its load. As soon, however, as a certain quantity of material is discharged by the bucket the counterpoised side of the beam B, or that part thereof to the left of its fulcrum, is free to descend and will move away from the counterweighted arm of the angle-lever 43, the valve, and hence the lever 43, connected thereto, being still blocked against opening movement, the limitation of the valve-opening movement continuing until the bucket has reached its normal position, when the valve and also the counterweighted lever 43 are released, so that the counterweighted arm of said lever may descend, the upright arm thereof being moved to the left, and thereby, through the described connections with the valve 38, opening the same.

At the commencement of operation the valve 38 will be in the position indicated in Fig. 3, such valve also holding the puppet-valve 30 open, so that a stream of material may flow from the inflow-pipe through the valve-chamber 28 and the pipe 27 and into the valve 38, from whence it flows laterally over the spout 39 and into the bucket G. As the valve 38 closes the puppet-valve 30 will be simultaneously closed.

At the commencement of the drip period, as indicated in Fig. 4, the puppet-valve 30 will have been closed for cutting off the supply of fluid to the valve 38. At this point in the operation of the machine the valve 38 will be held against further closing movement, so that a drip-stream of material may flow from the body of liquid in the valve 38 through the drip-spout 40 and into the bucket. When released, the valve 38 will be given its final closing movement by the counterweighted lever 42 and the drip-stream cut off by such action. For thus holding the valve 38 at the commencement of the poising period the following means may be employed: A by-pass stop is shown at 47, pivotally supported on the arm 6' of the scale-beam B, which is in position to engage a depending rod, as 48, connected to the valve-supporting arm 37'', whereby when this takes place the valve 38 may be held, suitable means being employed for holding the by-pass against oscillating movement during the drip period. On the return stroke of the depending rod 48 with the valve 38 it will engage the by-pass and swing the same ineffectively about its axis.

My present invention involves the provision of reciprocally-effective stops operative, respectively, with the valve and with the bucket mechanism, such stops serving to maintain the valve against opening movement while the bucket is in its load-discharging position, and also to prevent the discharge movement of the bucket while the valve is open and any part of the supply-stream is flowing into the bucket. The angle-lever 20, to which reference has been hereinbefore made, constitutes one of said pair of stops, the segment 49, attached to the valve-supporting arm 37', constituting the coacting stop. The upper end of the vertical arm of the angle-lever or stop 20 is furnished with a supplemental stop 50 in the form of a shoulder or flange, the segment 49 being equipped with a flange 51, the inner face of which is concentric with the axis of movement of the valve 38. The operation of these coacting stops is as follows: Fig. 3 represents the positions occupied thereby at the commencement of operation, the short outer face of the shoulder 50 being approximately in contact with the inner curved face of the flange 51, the offset 21 being also in engagement with the segmental flange 22, so that should the latch 24 be accidentally or maliciously tripped the bucket in attempting to tilt will oscillate the angle-lever or stop 20 and throw the shoulder 50 thereof against the flange 51 of the stop device 49, whereby the tilting or discharge movement of the bucket G will be prevented. When the valve 38 has been closed by its counterweighted lever 42 for cutting off the drip-stream, the outer short face of the shoulder 50 will pass out of contact with the inner curved face of the flange 51, and if the latch 24 should have been tripped the bucket G will be free to oscillate, and during such bucket movement the flange 22 will pass off the inclined face of the offset 21, which will thrust the long or vertical arm of the angle-lever 20 outward or to the right, with its shoulder beneath the flange 51, as indicated in Fig. 5, whereby said angle-lever serves to block the opening movement of the valve, it being evident that the segmental flange 22 prevents the movement of the stop or lever 20, so that the latter will be maintained in its effective position. When the bucket G resumes its normal position and when the offset 21 comes opposite the lower end of the flange 22, it may be swung into engagement therewith by the counterweight 23, so that the shoulder 50 of the angle-lever 20 may be forcibly moved out of engagement with the flange 51.

For tripping the latch 24 means operative with the cut-off valve 38 will be preferably employed and consist in the present instance of an extension 55, formed on the valve-supporting arm 37' and having a projection or antifriction-roll 56 at the lower end thereof, which impinges against the projection or toe of the latch 24 near the end of the closing movement of the valve, raising said latch and freeing the pin 22' on the angle-lever from hook 24' thereof, as indicated in Fig. 5. The valve 38 having been closed and the curved stop-face of the flange 51 having passed out of contact with the short face of the shoulder 50, the bucket is free of all restraint and may be instantly oscillated by the weight of the contents thereof to discharge the same into the hopper H'.

The bucket, it will be evident, is shiftable for discharging a load of material, and it will be furnished with means for retarding its return movement on the discharge of such load. The bucket G or the front wall thereof is intersected by the discharge-spout 57, constituting a part of the bucket, which is furnished on its lower side adjacent to the discharge edge with an open-ended pocket 58, the interior of which may communicate with the bucket G, so that a stream of liquid may flow from the bucket into said pocket at the commencement of the load-discharge period. The lower wall of the spout 57 is furnished with a relatively wide opening through which a supply of liquid may flow into the pocket 58, to be momentarily retained therein, so that the counterweight 25 may be slightly overbalanced and the discharge edge or end of the bucket held down and ample time thereby allowed for the discharge of the bucket contents. The liquid will flow rearward through the open end of the pocket 58, and a series of escape-openings 58' are formed in the lower wall of the pocket 58, through which the liquid may pass as the bucket resumes its normal position.

Briefly, the operation of the hereinbefore-described weighing-machine is as follows: Fig. 3 represents the positions occupied by the respective parts at the commencement of operation, the offset 21 being in engagement with the segmental flange 22 and the hook 24' of said latch 24 being in engagement with the projection 22' of the angle-lever 20, whereby the bucket is held against oscillating movement, and the valve 38 is also open, the cross-bar 41 thereof being in contact with the lower end of the rod 35, so that the puppet-valve 30 will be held away from its seat, (see Fig. 6,) whereby a stream of material may flow through the pipe 26, the valve-chamber 28, the pipe 27, and into the valve 38, from whence it flows laterally over the main spout 39 and into the empty bucket. When a certain proportion of the load has been received by the bucket, it will descend, the poising side of the beam B descending therewith, the upright arm of the angle-lever 43 being moved to the right, so that the valve 38 may be closed by the counterweighted arm 42. As the valve 38 is closed its cross-bar 41 will move away from the rod 35, whereby the valve 30 may be forced against its seat by the coiled spring 37. At the commencement of the poising period the puppet-valve 30 will have been closed, the result being a shutting off of the supply of liquid to the valve 38, and hence to the bucket. At this point the valve 38 is momentarily held by the by-pass 47 on the scale-beam B, which engages the depending rod 48, connected to said valve, so that a drip-stream may flow from the body of liquid in the valve 38 through the drip spout or channel 40 and into the bucket. While the drip-steam is flowing into the bucket it and the poising side of the scale-beam B will have a further descending movement, the by-pass 47 moving away from and below the arc of movement of the rod 48, so that it, and hence the valve 38, will be thereby released. When this action takes place, the valve 38 will be given its final closing movement by the counterweighted lever 42, so that the drip-stream may be shut off thereby, and near the close or end of this movement the antifriction-roll 56 will be moved into contact with the nose 24'' of the latch 24 and the latter thereby raised, as indicated in Fig. 5, freeing its hook 24' from the pin 22' on the angle-lever 20, so that the latter, and hence the bucket, is free to oscillate. On the oscillation of the bucket the load therein will be discharged into the hopper H'.

Having described my invention, I claim—

1. The combination with a bucket and with means for supplying a stream of material thereto, of a main scale-beam having supports for said bucket; an auxiliary scale-beam also provided with a bucket-support; and a connection between the counterweight of said main scale-beam and the auxiliary scale-beam.

2. The combination with a bucket and a supporting-frame for said bucket to which it is pivoted, of means for supplying a stream of material to said bucket; a main scale-beam having a pair of arms connected to said bucket-frame; and an auxiliary scale-beam supported for movement between the arms of the main scale-beam and provided with a bucket-support.

3. The combination with weighing mechanism including an oscillatory bucket, of a frame for supporting said bucket; beam mechanism comprehending main and auxiliary scale-beams, for sustaining said bucket-frame, the auxiliary scale-beam being longitudinally yieldingly mounted; a hopper; a valve for said hopper; and means for actuating said valve to open and close the same alternately.

4. The combination with weighing mechanism including a bucket supported for oscillatory movement, of a frame for sustaining said bucket; main and auxiliary beams for supporting said bucket-frame, one of said beams being longitudinally yieldingly mounted; means comprehending a latch, for normally holding said bucket against discharge movement; a hopper; a valve for said hopper; means controlled by the weighing mechanism, for actuating said valve to open and close the same alternately; and a latch-tripping device operative with said valve.

5. The combination with a shiftable bucket provided with a detent, of an angle-lever having a detent for engaging said first-mentioned detent; and a latch for engaging said angle-lever.

6. The combination with a valve, of a shiftable bucket provided with a detent; an angle-lever provided with a detent for engaging said first-mentioned detent, said angle-lever also constituting a stop; and a coacting stop operative with the valve.

7. The combination with a valve, of a shiftable bucket provided with a detent; an angle-lever having a detent for engaging said first-mentioned detent, said angle-lever also constituting a stop; a coacting stop operative with said valve; and a latch for engaging said angle-lever.

8. The combination with a valve, of a shiftable bucket provided with a detent; an angle-lever having a detent for engaging said first-mentioned detent, said angle-lever also constituting a stop; a coacting stop connected to said valve; and a latch-tripping device also connected to said valve.

9. The combination with a valve, of a shiftable bucket having a segmental flange thereon; a counterweighted angle-lever provided with a detent for engaging said flange, said angle-lever also having a shoulder; and a stop operative with said valve and furnished with a flange contiguous to said closer.

10. The combination with a valve, of bucket mechanism and its supporting scale-beam; and a counterweighted angle-lever supported by said scale-beam, one arm of which lever is operatively connected to the valve.

11. The combination with a valve, of bucket mechanism and its supporting scale-beam; and a counterweighted angle-lever supported by said scale-beam, one arm of which is slidingly connected to the valve.

12. The combination with a valve and a supporting-arm therefor provided with a projection, of a link pivoted to said projection and having a longitudinal slot in one end; a bucket and a scale-beam; and a counterweighted angle-lever supported by said scale-beam, one arm of which is provided with a pin passing through the slot in said link.

13. The combination with a bucket, of a tubular valve-casing having a valve-seat therein; a spring-actuated valve located within said casing; means for actuating said valve to close the same; and a second valve coöperative with the first-mentioned valve and operable for limiting the closure thereof and for also opening the same.

14. The combination with a bucket, of a fluid-casing having a valve-seat; a valve operable in said casing; a depending rod connected to said valve and bifurcated at its bottom; a stud located within the fluid-casing and extending between the branches of the bifurcation; means for closing said valve; and a second valve operable for limiting the closure of the first-mentioned valve and for also engaging said rod.

15. The combination with a bucket, of a fluid-casing having a valve-seat; a valve located within said casing and having oppositely-extending rods, one of which is embraced by a coiled spring constituting a valve-closing device, the other rod being bifurcated at its bottom; a stud seated within said casing and passing between the branches of said bifurcation; and a second valve operable for limiting the closure of the first-mentioned valve and for also opening the same.

16. The combination with a fluid-casing having a valve operative therein and movable toward its seat; a depending rod connected to said valve; and a cut-off valve provided with a cross-bar against which said depending rod is adapted to abut.

17. A valve provided with a main supply-chamber and a tubular portion communicating therewith, said tubular portion having a main spout and a drip-stream spout.

18. The combination with a bucket and with means for supplying a stream of material thereto, of a tubular valve provided with main and drip stream spouts; and valve-actuating mechanism.

FRANCIS H. RICHARDS.

Witnesses:
FRED. J. DOLE,
HENRY BISSELL.